Patented July 27, 1954

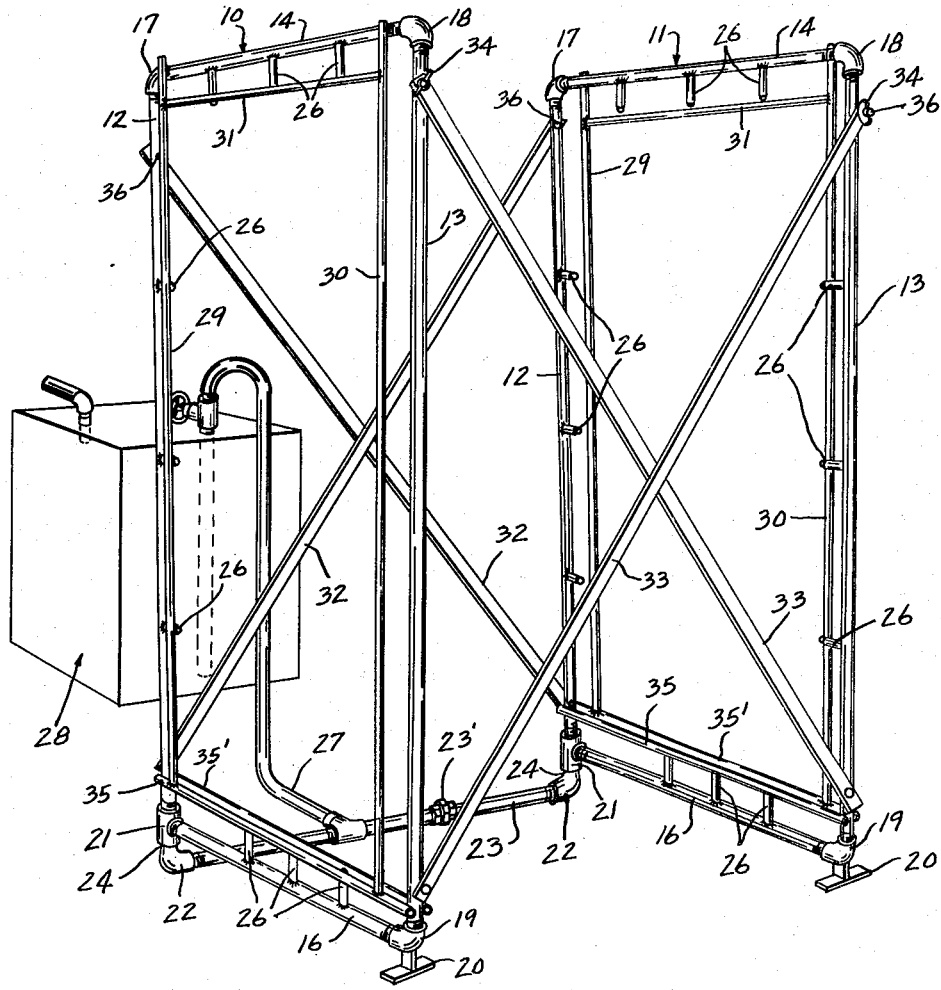

2,684,658

UNITED STATES PATENT OFFICE 2,684,658

LIVESTOCK SPRAYER

Clarence J. Richardson and Arthur C. West,
Cleveland, Miss.

Application May 12, 1952, Serial No. 287,324

1 Claim. (Cl. 119—159)

This invention relates to apparatus for spraying livestock and has for an object the provision of apparatus which shall be simple of design, economical of manufacture and which shall be effective to spray cattle quickly and economically.

Another object of our invention is to provide apparatus for spraying livestock which may be easily collapsed and moved from one location to another.

A still further object of our invention is to provide spray apparatus which shall embody an enclosure formed of tubular members which serve as supply conduits for the spray fluid.

Apparatus embodying features of our invention is illustrated in the accompanying drawing forming a part of this application in which the single figure thereof is a perspective view of the apparatus.

Referring now to the drawing for a better understanding of our invention we show two rectangular frame members 10 and 11 formed of tubular members, such as metal pipes. Each frame member embodies vertical pipe sections 12 and 13 which are spaced from each other a sufficient distance and are of a sufficient height to permit the livestock to be sprayed to pass therebetween. Connecting the upper ends of the vertical pipes 12 and 13 is an upper horizontal pipe section 14 and connecting the lower ends of the vertical pipes 12 and 13 is a lower horizontal pipe section 16.

The vertical pipe sections 12 and 13 together with the upper and lower pipe sections 14 and 16 form a continuous passage for the fluid to be sprayed. While the upper, lower and vertical sections of pipe may be formed from a continuous tube of metal, we preferably connect the upper pipe section 14 to the vertical pipe sections 12 and 13 by elbow fittings 17 and 18 respectively. One end of the lower pipe section 16 is connected to the vertical pipe 13 by means of an elbow fitting 19. The other end of the lower pipe section 16 is connected to the vertical pipe section 12 by means of a T fitting 21, the branch of the T being connected to the lower pipe section. A bracket 20 is secured to each of the elbow fittings 19, as shown, so as to position the pipe sections 16 in substantially horizontal planes.

Connected to the lower end of the T fitting 21 for pivotal movement with respect thereto is an elbow swivel joint 22. The swivel joint 22 of the frame member 10 is connected to the swivel joint 22 of the frame member 11 by means of a pipe 23 to form a single fluid supply conduit, thereby permitting the frame members 10 and 11 to be moved inwardly toward the pipe 23 by pivoting them about pivot points 24. The pipe 23 is divided into sections which are joined by a union 23', thus permitting the frame members 10 and 11 to be separated from each other by disconnecting the union.

Mounted on the upper pipe connection 14, the lower pipe section 16 and the vertical pipe sections 12 and 13 are a plurality of inwardly directed spray nozzles 26. Preferably, the nozzles 26 are so aligned that the spray from the nozzles overlap and form a liquid spray area, thus assuring that the entire surface of livestock passing through is sprayed. Communicating with the pipe 23 is a supply conduit 27 which receives the spray fluid under pressure from a suitable source, such as tank 28. Preferably, the conduit 27 is in the form of a flexible hose. The spray fluid is thus delivered from the tank 28 through the supply conduit 27 to the conduit 23 thence through the pipe sections 12, 13, 14 and 16 to the spray nozzles 26.

Secured to each of the frame members 10 and 11 and positioned inwardly of the spray nozzles which are mounted on the vertical pipe sections 12 and 13 are elongated vertically extending rods or pipes 29 and 30 which serve as guards to protect the nozzles 26 against coming in contact with the animal to be sprayed. The nozzles mounted on the upper pipe section 14 are protected by means of a horizontally extending rod or bar 31 which is positioned inwardly of the ends of the spray nozzles. The nozzles mounted on the lower pipe section 16 are protected against coming in contact with the feet of the animal to be sprayed by a pair of rods or pipes 35 and 35', which are positioned on opposite sides of the nozzles as shown. The rods or pipes 29, 30, 31, 35 and 35' also form guard members which protect the livestock from being injured by coming in contact with the spray nozzles.

Pivotally connected to the vertical pipe sections 12 and 13 adjacent the bottom thereof are elongated diagonal brace members 32 and 33 respectively. The free ends of the brace members 32 and 33 of one frame member, 10 or 11 as the case may be, are detachably connected to the upper end of the vertical pipe sections 12 and 13 of the other frame member by any suitable means, such as by wing nuts 34 which engage bolts 36 secured to the pipe sections 12 and 13.

To collapse the apparatus for transporting the same to different locations the wing nuts 34 are removed and the brace members 32 and 33 are moved alongside the frame members 10 and 11.

The frame members 10 and 11 are then pivoted with respect to the pipe 23, thus permitting the frame members to be moved alongside the pipe 23 and alongside each other. If desired, the fittings 22 may be rigidly secured to the frame members 10 and 11 and the frame members separated from each other by disconnecting the union 23'.

From the foregoing it will be seen that we have provided improved apparatus for spraying livestock which is very economical of manufacture, simple of construction and which may be easily collapsed and moved from place to place. By supplying the spray fluid through the members which form the enclosure for passing the livestock, there is a substantial saving in the material required to construct the apparatus.

While we have shown our invention in but one form, it will be obvious to those skilled in the art that it is not so limited but is susceptible of various changes and modifications without departing from the spirit thereof, and we desire, therefore, that only such limitations shall be placed thereupon as are specifically set forth in the appended claim.

What we claim is:

Apparatus for spraying livestock comprising a pair of rectangular vertically disposed frames formed of pipe and spaced apart by diagonal brace members to define therethrough an enclosed animal passageway therebetween, the pipes of said frames being connected together to provide closed contiguous liquid spray areas in said passageway, a plurality of spray nozzles along the inner surface of the rectangular frames directed inwardly toward the animal passageway, inner frames carried by the outer frames and spaced inwardly of the pipes thereof a distance slightly more than the length of said nozzles, a fluid inlet conduit pivotally connecting the two outer frames, a single fluid supply conduit connected to the fluid inlet conduit, said brace members each having one end pivotally connected to a lower corner of one side of one of the rectangular frames and the other end removably connected to an upper corner of an adjacent side of the other said frame.

References Cited in the file of this patent

UNITED STATES PATENTS

| Number | Name | Date |
|---|---|---|
| 870,766 | Eaton | Nov. 12, 1907 |
| 876,631 | Goff | Jan. 14, 1908 |
| 1,767,560 | Snyder | June 24, 1930 |

FOREIGN PATENTS

| Number | Country | Date |
|---|---|---|
| 628,306 | Great Britain | Aug. 25, 1949 |